P. ARNOLTS.
COUPLING FOR ANTISKID CHAINS.
APPLICATION FILED OCT. 17, 1919.

1,342,616.

Patented June 8, 1920.

Inventor
Peter Arnolts
By His Attorneys

UNITED STATES PATENT OFFICE.

PETER ARNOLTS, OF ODELL, ILLINOIS.

COUPLING FOR ANTISKID-CHAINS.

1,342,616.  Specification of Letters Patent. Patented June 8, 1920.

Application filed October 17, 1919. Serial No. 331,346.

*To all whom it may concern:*

Be it known that I, PETER ARNOLTS, a citizen of the United States, residing in Odell, in the county of Livingston and State of Illinois, have invented certain new and useful Improvements in Couplings for Antiskid-Chains, of which the following is a specification.

The object of this invention is to provide a simple and efficient device for coupling the ends of antiskid automobile chains.

Ordinarily considerable effort is required to bring together the ends of such chains and much time is often taken in properly coupling them.

According to my invention the chains are provided with devices by means of which their ends may be quickly coupled, tension being so applied as to hold the chains securely on the tire, and the chains are so fastened that they are not liable to work loose.

In the accompanying drawings:—

Figure 1:
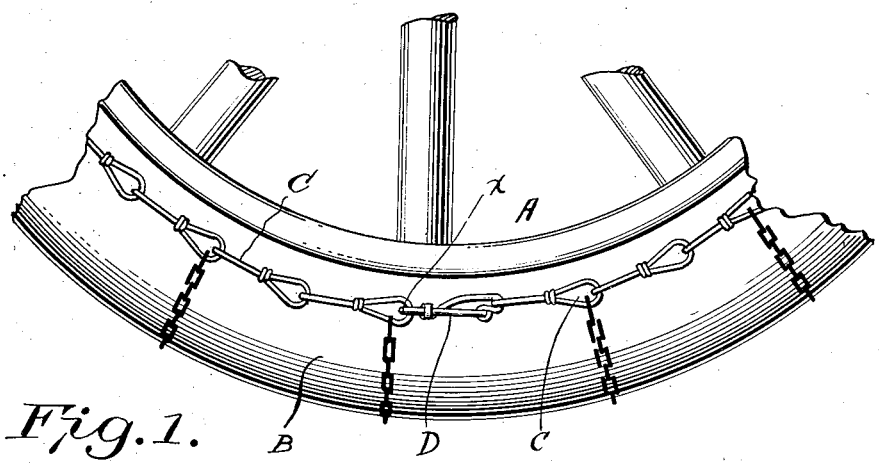
Figure 1 shows a side elevation of a part of an automobile wheel having an antiskid chain applied to its tire, and equipped with my improved chain coupling.

The drawings show, in Fig. 1, a portion of a wheel A, having a tire B carrying an antiskid chain C of well known construction. D indicates my improved device for coupling and fastening the ends of the chain.

Figure 2:
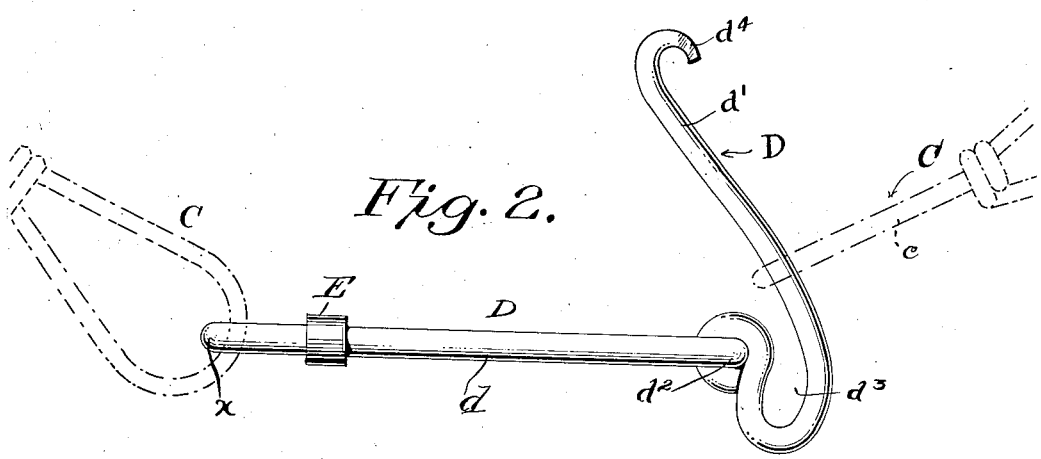
Fig. 2 is a view on an enlarged scale and in side elevation of my improved chain coupling device, and indicates how it is applied to an automobile wheel equipped with an antiskid chain.
Figure 3:
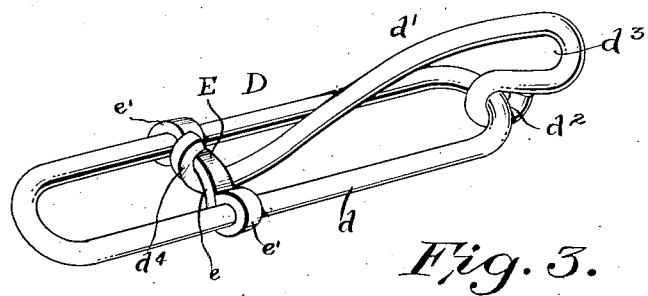
Fig. 3 is a perspective view of the coupling device.

The improved coupling comprises a link $d$, to which is hinged at one end a lever $d'$ having its end bent to form an eye $d^2$ by means of which it is coupled or hinged to the end of the link $d$. The lever is also formed with a loop $d^3$ adjacent the eye $d^2$ and which has an arm $d'$ having a hooked end $d^4$. The arm $d'$ has a double curve, as indicated, better adapting it to act as a lever and to assume the proper position to couple the ends of the chain. E indicates a lever locking device, comprising a cross piece $e$ having at opposite ends eyes $e'$ through which the side portions of the link $d$ extend. The locking device is adapted to slide on the link from end to end thereof. One end of the link, as indicated at $x$, is applied to one end of the chain C. This connection is a permanent one and when it is desired to connect the ends of the chain, the lever arm $d'$ is passed through the end link $c$ of the chain in the manner indicated in Fig. 2. Then the lever arm is pressed down into the link $d$ in the manner indicated in Fig. 2 and also in Fig. 1. In this operation the two ends of the chain are moved toward each other and placed under tension. When performing this operation, the locking device E is moved to one end of the link, away from the lever, so that the end of the lever may be passed through the link or into it. Then the locking device is slid along the side bars of the link and passed over the hooked end of the lever, and is then moved backward a short distance until it engages the hooked end of the lever.

When the hands of the attendant are released, the chain puts a tension on the coupling, and the locking device E is firmly held in engagement with the hooked end of the lever.

I have shown one coupling device; where the chain is made in sections, similar coupling devices may be applied at the proper places.

It will be observed that the cross piece $e$ of the lever locking device lies in the same plane with the two sides of the link $d$ so that the hooked end of the lever lies within the link when it engages the locking device. It will also be observed that the eye $d^2$ of the locking lever is formed by bending the end of the lever which, as shown, is made of wire. The lever can therefore be readily applied to the link by merely bending its end around the end of the link and if the lever is broken a new one can easily be attached to the link. It will furthermore be observed that the loop $d^3$ of the lever has its sides or arms substantially parallel with each other and when the lever is engaged with the device E these arms which are parallel with each other are also substantially parallel with the link so that when strain is exerted on the device it will be in a direct line as indicated in Fig. 1. In such case no strain is exerted on the locking device E but is transmitted through the shorter arm of the loop $d^3$ directly to the link. This strain is endwise and not diagonal as it would be if the loop were otherwise formed.

Experience has demonstrated that the coupling device herein shown and described operates most efficiently. It is very simple in construction, may for the most part be made of wire, and may be easily applied and operated.

I claim as my invention:—

A coupling and fastening device for antiskid chains, comprising a wire link, a wire lever having one end bent to form an eye to provide a hinge connection with one end of the link and formed with a loop at one end near the eye the sides of the arms of which are substantially parallel with each other and with the sides of the link when in locked position, said lever being provided at its outer end with a hook and a locking device for the lever comprising a cross piece with which the hooked end of the lever engages and which lies in the plane of the link and has eyes at opposite ends engaging the link.

In testimony whereof, I have hereunto subscribed my name.

PETER ARNOLTS.